(12) United States Patent
Tanaka et al.

(10) Patent No.: US 12,483,796 B2
(45) Date of Patent: Nov. 25, 2025

(54) IMAGE GENERATION DEVICE, IMAGE GENERATION METHOD, AND IMAGE GENERATION PROGRAM

(71) Applicant: FUJIFILM Corporation, Tokyo (JP)

(72) Inventors: Yasushi Tanaka, Saitama (JP); Hiroyuki Mizukami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 140 days.

(21) Appl. No.: 18/187,369

(22) Filed: Mar. 21, 2023

(65) Prior Publication Data

US 2023/0308766 A1    Sep. 28, 2023

(30) Foreign Application Priority Data

Mar. 24, 2022    (JP) .................... 2022-049072

(51) Int. Cl.
*H04N 23/71*    (2023.01)
*G06F 3/0354*    (2013.01)
(Continued)

(52) U.S. Cl.
CPC ......... *H04N 23/71* (2023.01); *G06F 3/03542* (2013.01); *G06F 3/12* (2013.01);
(Continued)

(58) Field of Classification Search
CPC ...... H04N 23/71; H04N 23/62; H04N 23/667; H04N 23/73; H04N 23/76; H04N 5/272;
(Continued)

(56) References Cited

U.S. PATENT DOCUMENTS

2008/0291179 A1* 11/2008 Willemsen .............. G06F 3/042
345/180
2009/0021480 A1    1/2009 Tagawa
(Continued)

FOREIGN PATENT DOCUMENTS

CN       110035141 A    7/2019
JP     2016-149631 A    8/2016
(Continued)

OTHER PUBLICATIONS

Machine translation of JP2021166330 (Year: 2021).*
(Continued)

*Primary Examiner* — Kelly L Jerabek
(74) *Attorney, Agent, or Firm* — Studebaker Brackett PLLC

(57) ABSTRACT

The image generation device includes a camera that captures light emitted from an instruction device, and a processor that is configured to generate a drawing image based on a detection status in which the light is detected from a captured image, which is captured by the camera, in which the processor is configured to cause the camera to change an exposure of an entire imaging surface to capture the captured image, detect the light from the captured image, which is captured in a state in which the exposure is changed, and record the drawing image, which is generated based on the detection status of the light, by correcting a brightness of a background region, which is a background of the light.

25 Claims, 11 Drawing Sheets

(51) Int. Cl.
*G06F 3/12* (2006.01)
*H04N 5/272* (2006.01)
*H04N 23/62* (2023.01)
*H04N 23/667* (2023.01)
*H04N 23/73* (2023.01)

(52) U.S. Cl.
CPC ............. *H04N 5/272* (2013.01); *H04N 23/62* (2023.01); *H04N 23/667* (2023.01); *H04N 23/73* (2023.01)

(58) Field of Classification Search
CPC ........ H06F 3/0304; H06F 3/02; H06F 3/0346; H06F 3/03545; H06F 3/038; H06F 3/03542; H06F 3/12; H06F 3/0386; H06F 3/016; G06T 5/50; G06T 2207/20221
See application file for complete search history.

(56) References Cited

U.S. PATENT DOCUMENTS

| | | | | |
|---|---|---|---|---|
| 2014/0168069 | A1* | 6/2014 | Chen | G06F 3/04883 345/156 |
| 2017/0280064 | A1* | 9/2017 | Wei | H04N 23/70 |
| 2019/0182414 | A1 | 6/2019 | Okubo | |
| 2022/0091480 | A1* | 3/2022 | House | G03B 15/06 |
| 2023/0262320 | A1* | 8/2023 | Hu | H04N 23/651 348/222.1 |

FOREIGN PATENT DOCUMENTS

| | | |
|---|---|---|
| JP | 2019-106647 A | 6/2019 |
| JP | 2021-166330 A | 10/2021 |
| JP | 2021-175067 A | 11/2021 |
| WO | 2006/085580 A1 | 8/2006 |
| WO | 2022/034744 A1 | 2/2022 |

OTHER PUBLICATIONS

The extended European search report issued by the European Patent Office on Jul. 27, 2023, which corresponds to European Patent Application No. 23163387.6-1208 and is related to U.S. Appl. No. 18/187,369.

"Notice of Reasons for Refusal" Office Action issued in JP 2022-049072; mailed by the Japanese Patent Office on Sep. 30, 2025.

* cited by examiner

IMAGE GENERATION DEVICE, IMAGE GENERATION METHOD, AND IMAGE GENERATION PROGRAM

CROSS REFERENCE TO RELATED APPLICATIONS

This application claims priority from Japanese Application No. 2022-049072, filed on Mar. 24, 2022, the entire disclosure of which is incorporated herein by reference.

BACKGROUND

1. Technical Field

The present disclosure relates to an image generation device, an image generation method, and a non-transitory storage medium storing an image generation program.

2. Related Art

In the related art, there is known a technique of capturing light of a light pen or the like and detecting the light from the obtained image. For example, WO2006/085580 describes a pointer light tracking method in which pointer light is captured by a camera and the pointer light on a display is tracked by a computer based on the obtained image.

In the technique described in WO2006/085580, detection of the pointer light is facilitated by adjusting a camera shutter speed or the like to acquire an image in which the pointer light is projected strongly.

In the technique described in WO2006/085580, in an image in which the pointer light is projected strongly, the pointer light can be easily detected, but the image quality of the background region may deteriorate.

SUMMARY

The present disclosure has been made in view of the above circumstances, and an object of the present disclosure is to provide an image generation device, an image generation method, and a non-transitory storage medium storing an image generation program capable of obtaining a high quality drawing image even in a background region.

In order to achieve the above object, an image generation device according to a first aspect of the present disclosure comprises: a camera that captures light emitted from an instruction device; and a processor that is configured to generate a drawing image based on a detection status in which the light is detected from a captured image, which is captured by the camera, in which the processor is configured to cause the camera to change an exposure of an entire imaging surface to capture the captured image, detect the light from the captured image, which is captured in a state in which the exposure is changed, and record the drawing image, which is generated based on the detection status of the light, by correcting a brightness of a background region, which is a background of the light.

In the image generation device of a second aspect of the present disclosure according to the image generation device of the first aspect, the processor is configured to adjust a sensitivity based on an amount of change in the exposure of the entire imaging surface.

In the image generation device of a third aspect of the present disclosure according to the image generation device of the first aspect or the second aspect, the brightness of the background region is equal to a brightness of the captured image obtained immediately before changing the exposure of the entire imaging surface.

Further, in order to achieve the above object, an image generation device according to a fourth aspect of the present disclosure comprises: a camera that captures light emitted from an instruction device; and a processor that is configured to generate a drawing image based on a detection status in which the light is detected from a captured image, which is captured by the camera, in which the processor is configured to cause the camera to change an exposure of an entire imaging surface to capture the captured image, cause the camera to capture a background image, which is a background of the light in the captured image, by adjusting the exposure, and generate a composite image by composing the drawing image drawn based on the detection status in which the light is detected and the background image.

In the image generation device of a fifth aspect of the present disclosure according to the image generation device of the fourth aspect, the processor is configured to cause the camera to capture the background image by restoring the exposure to a state before changing the exposure of the entire imaging surface.

In the image generation device of a sixth aspect of the present disclosure according to the image generation device of the fourth aspect or the fifth aspect, the processor is configured to receive an instruction of making a transition to a drawing mode used for generating the drawing image, and change the exposure of the entire imaging surface from a standard exposure specified according to an imaging environment in a case in which the transition to the drawing mode is made based on the instruction.

In the image generation device of a seventh aspect of the present disclosure according to the image generation device of the sixth aspect, the processor is configured to transmit a light emission instruction signal used for causing the instruction device to emit the light in a case in which the instruction is received.

In the image generation device of an eighth aspect of the present disclosure according to the image generation device of any one of the first aspect to the seventh aspect, the processor is configured to change the exposure of the entire imaging surface in a case in which the light is not capable of being detected from the captured image.

In the image generation device of a ninth aspect of the present disclosure according to the image generation device of the eighth aspect, changing the exposure of the entire imaging surface means changing the exposure in a direction of reducing the exposure.

In the image generation device of a tenth aspect of the present disclosure according to the image generation device of any one of the first aspect to the ninth aspect, the processor is configured to change the exposure of the entire imaging surface by adjusting at least one of a shutter speed or a stop of the camera.

In the image generation device of an eleventh aspect of the present disclosure according to the image generation device of any one of the first aspect to the tenth aspect, the light is light having a predetermined wavelength, and the processor is configured to detect the light from the captured image based on a luminance of the light and color corresponding to the predetermined wavelength.

In the image generation device of a twelfth aspect of the present disclosure according to the image generation device of any one of the first aspect to the eleventh aspect, the instruction device is a drawing device for a space drawing.

In the image generation device of a thirteenth aspect of the present disclosure according to the image generation device of any one of the first aspect to the twelfth aspect, the instruction device has a print function of printing the drawing image generated by the image generation device.

In order to achieve the above object, an image generation method according to a fourteenth aspect of the present disclosure executed by a processor of an image generation device including a camera that captures light emitted from an instruction device and the processor that is configured to generate a drawing image based on a detection status in which the light is detected from a captured image, which is captured by the camera, the image generation method comprises: causing the camera to change an exposure of an entire imaging surface to capture the captured image; detecting the light from the captured image, which is captured in a state in which the exposure is changed; and recording the drawing image, which is generated based on the detection status of the light, by correcting a brightness of a background region, which is a background of the light.

In order to achieve the above object, an image generation method according to a fifteenth aspect of the present disclosure executed by a processor of an image generation device including a camera that captures light emitted from an instruction device and the processor that is configured to generate a drawing image based on a detection status in which the light is detected from a captured image, which is captured by the camera, the image generation method comprises: causing the camera to change an exposure of an entire imaging surface to capture the captured image; causing the camera to capture a background image, which is a background of the light in the captured image, by adjusting the exposure; and generating a composite image by composing the drawing image drawn based on the detection status in which the light is detected and the background image.

In order to achieve the above object, a non-transitory storage medium storing an image generation program according to a sixteenth aspect of the present disclosure for causing a processor of an image generation device including a camera that captures light emitted from an instruction device and the processor that is configured to generate a drawing image based on a detection status in which the light is detected from a captured image, which is captured by the camera, to execute processing including: causing the camera to change an exposure of an entire imaging surface to capture the captured image; detecting the light from the captured image, which is captured in a state in which the exposure is changed; and recording the drawing image, which is generated based on the detection status of the light, by correcting a brightness of a background region, which is a background of the light.

In order to achieve the above object, a non-transitory storage medium storing an image generation program according to a seventeen aspect of the present disclosure for causing a processor of an image generation device including a camera that captures light emitted from an instruction device and the processor that is configured to generate a drawing image based on a detection status in which the light is detected from a captured image, which is captured by the camera, to execute processing including: causing the camera to change an exposure of an entire imaging surface to capture the captured image; causing the camera to capture a background image, which is a background of the light in the captured image, by adjusting the exposure; and generating a composite image by composing the drawing image drawn based on the detection status in which the light is detected and the background image.

According to the present disclosure, it is possible to obtain a high quality drawing image even in a background region.

DETAILED DESCRIPTION

Hereinafter, examples of embodiments for performing the technique of the present disclosure will be described in detail with reference to the drawings.

FIRST EMBODIMENT

Figure 1:
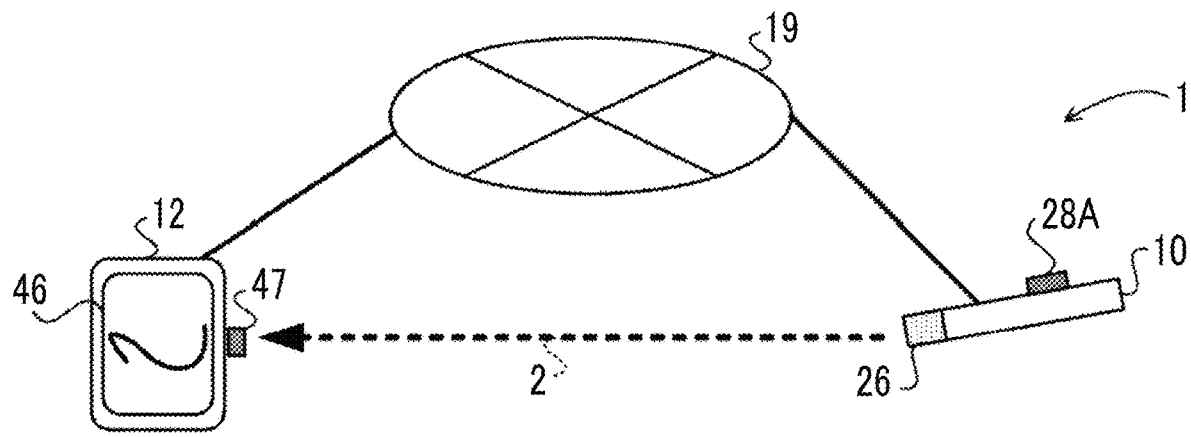
FIG. 1 is a configuration diagram showing an example of a configuration of a space drawing system according to an embodiment.

A configuration of a space drawing system 1 of the present embodiment will be described with reference to FIG. 1. As shown in FIG. 1, the space drawing system 1 of the present embodiment includes a drawing device 10 and a smartphone 12. The drawing device 10 and the smartphone 12 are connected to each other via a network 19 by wired communication or wireless communication.

Figure 2:
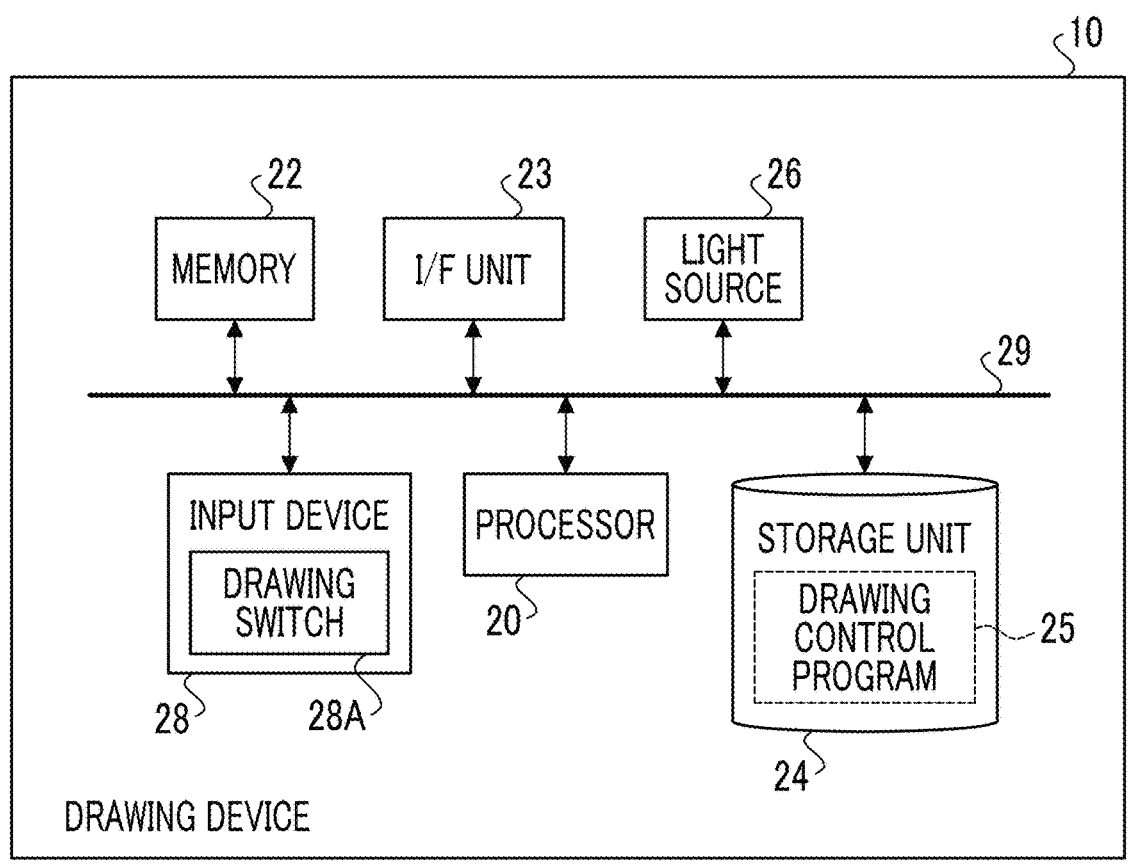
FIG. 2 is a block diagram showing an example of a hardware configuration of a drawing device according to the embodiment.

A configuration of the drawing device 10 according to the present embodiment will be described with reference to FIG. 2. The drawing device 10 of the present embodiment is a device for a user to perform drawing in space with light emitted from a light source 26 (see light 2 in FIG. 1) in a case where the user, who performs the drawing, holds and moves the drawing device 10 that emits light from the light source 26. As an example, in the present embodiment, a light pen type drawing device 10 will be described. The drawing device 10 of the present embodiment is an example of an instruction device of the present disclosure.

On the other hand, the smartphone 12 includes a camera 47 that captures light emitted from the light source 26 of the drawing device 10. The smartphone 12 has a function of detecting the light from the light source 26 of the drawing device 10 from the captured image captured by the camera 47 and generating a drawing image based on a detection status. The smartphone 12 of the present embodiment is an example of an image generation device of the present disclosure.

As an example, in the present embodiment, a user, who performs drawing by using the drawing device 10, and a user, who captures light emitted from the drawing device 10 to generate a drawing image by using the smartphone 12, are different users. In the present embodiment, in order to distinguish between the two users, a user, who performs drawing by using the drawing device 10, is referred to as a "drawing user", and a user, who performs imaging and generation of a drawing image by using the smartphone 12, is referred to as an "imaging user".

First, the details of the drawing device 10 will be described. FIG. 2 shows a block diagram representing an example of a configuration related to a function for space drawing in the drawing device 10. As shown in FIG. 2, the drawing device 10 includes a processor 20, a memory 22, an I/F (Interface) unit 23, a storage unit 24, a light source 26, and an input device 28. The processor 20, the memory 22, the I/F unit 23, the storage unit 24, the light source 26, and the input device 28 are connected to each other via a bus 29 such as a system bus or a control bus so that various types of information can be exchanged.

The processor 20 reads various programs including a drawing control program 25 stored in the storage unit 24 into the memory 22 and executes processing according to the read program. The memory 22 is a work memory for the processor 20 to execute the processing. The storage unit 24 stores the drawing control program 25, various other information, and the like. Specific examples of the storage unit 24 include a hard disk drive (HDD) and a solid state drive (SSD).

The I/F unit 23 communicates various types of information with the smartphone 12 by wireless communication or wired communication. The input device 28 including a drawing switch 28A functions as a user interface. The drawing switch 28A is a switch that is operated to input various instructions in a case where the drawing user performs drawing and is provided on a surface of a main body of the drawing device 10.

The light source 26 emits light for drawing, and examples thereof include a light emitting diode (LED). As an example, in the present embodiment, a high luminance type LED is used. Further, in order to improve a light detection rate of the light source 26 in the smartphone 12, an LED having an emission color of pure green is adopted instead of a color mixture such as yellow green or the like. Further, since it is preferable that light leakage is small, a light source having high directivity is adopted.

Figure 3:
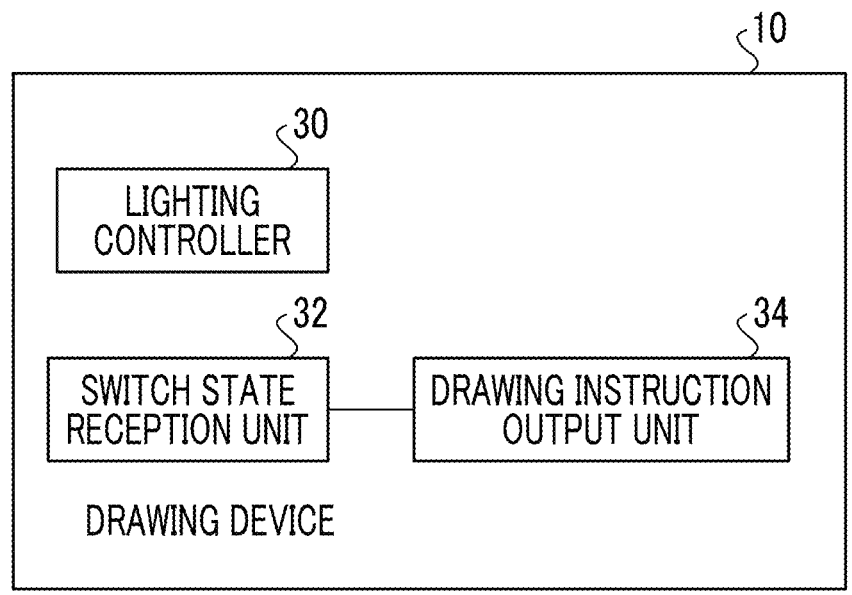
FIG. 3 is a functional block diagram showing an example of a configuration of the drawing device according to the embodiment.

FIG. 3 shows a functional block diagram representing an example of a configuration related to a function of the drawing device 10 according to the present embodiment. As shown in FIG. 3, the drawing device 10 includes a lighting controller 30, a switch state reception unit 32, and a drawing instruction output unit 34. As an example, in the drawing device 10 according to the present embodiment, by the processor 20 executing the drawing control program 25 stored in the storage unit 24, the processor 20 functions as the lighting controller 30, the switch state reception unit 32, and the drawing instruction output unit 34.

The lighting controller 30 has a function of controlling lighting and extinguishing of the light source 26. As an example, the lighting controller 30 of the present embodiment performs control of lighting the light source 26 in a case where a lighting instruction, which is output from the smartphone 12, is input. The lighting instruction of the present embodiment is an example of a light emission instruction signal of the present disclosure. Further, the lighting controller 30 performs control of extinguishing the light source 26 in a case where an extinguishing instruction, which is output from the smartphone 12, is input.

The switch state reception unit 32 has a function of receiving an operation state of the drawing switch 28A operated by the drawing user. As an example, in the present embodiment, in a case where the drawing user starts drawing by using the drawing device 10, the drawing user lights the light source 26 and then operates the drawing switch 28A to instruct the drawing device to start drawing. In the following, the fact that the drawing switch 28A is operated to instruct the drawing device 10 to start drawing is referred to as "turning on the drawing switch 28A" or the like. Further, in the present embodiment, in a case where the drawing user ends drawing by using the drawing device 10, the drawing user operates the drawing switch 28A to instruct the drawing device 10 to end drawing. In the following, the fact that the drawing switch 28A is operated to instruct the drawing device 10 to end drawing is referred to as "turning off the drawing switch 28A" or the like.

The drawing instruction output unit 34 has a function of outputting a drawing start instruction and a drawing end instruction according to a state of the drawing switch 28A received by the switch state reception unit 32, to the smartphone 12. Specifically, in a case where the switch state reception unit 32 receives that the drawing switch 28A is turned on as the operation state of the drawing switch 28A, the drawing instruction output unit 34 outputs the drawing start instruction to the smartphone 12. Further, in a case where the switch state reception unit 32 receives that the drawing switch 28A is turned off as the operation state of the drawing switch 28A, the drawing instruction output unit 34 outputs the drawing end instruction to the smartphone 12. In the present embodiment, in a case where collectively referring to the drawing start instruction and the drawing end instruction, it is referred to as a "drawing instruction".

Figure 4:
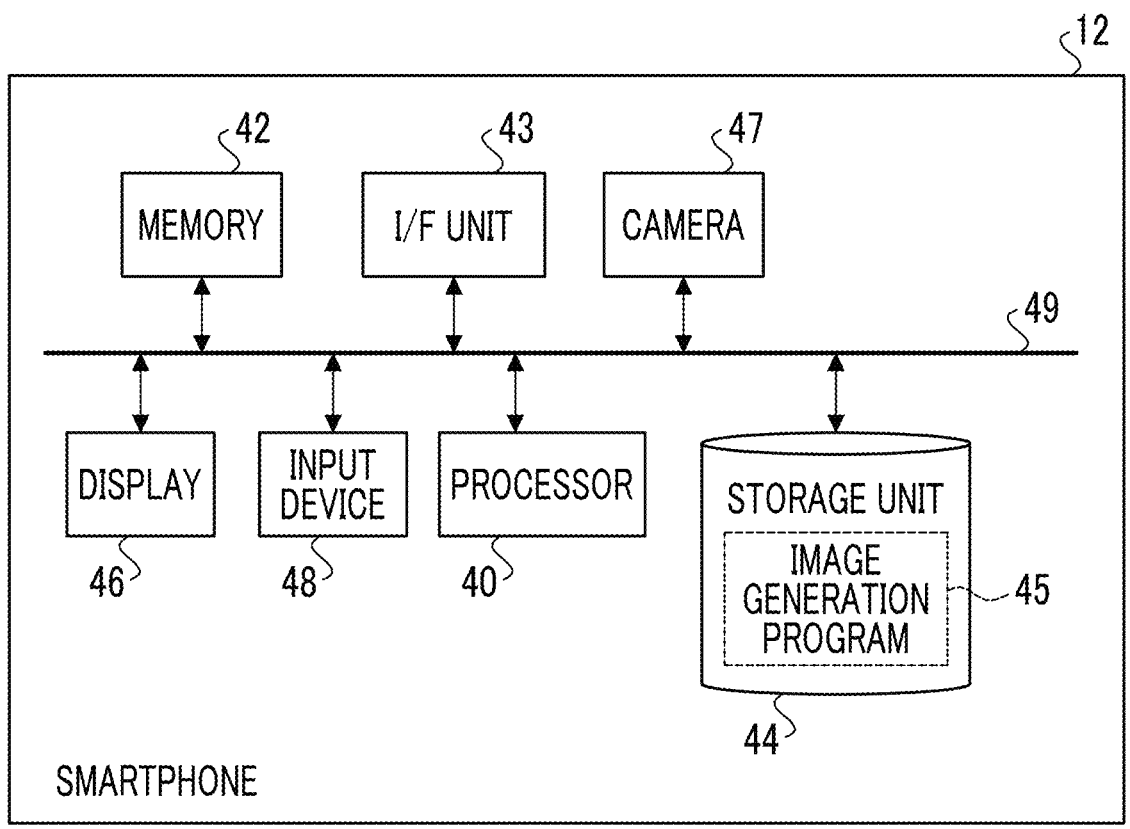
FIG. 4 is a block diagram showing an example of a hardware configuration of a smartphone according to the embodiment.

Next, the details of the smartphone 12 will be described. FIG. 4 is a block diagram representing an example of a configuration related to a function for the generation of the drawing image in the smartphone 12. As shown in FIG. 4, the smartphone 12 includes a processor 40, a memory 42, an I/F unit 43, a storage unit 44, a display 46, a camera 47, and an input device 48. The processor 40, the memory 42, the I/F unit 43, the storage unit 44, the display 46, the camera 47, and the input device 48 are connected to each other via a bus 49 such as a system bus or a control bus so that various types of information can be exchanged.

The processor 40 reads various programs including an image generation program 45 stored in the storage unit 44 into the memory 42 and executes processing according to the read program. The memory 42 is a work memory for the processor 40 to execute the processing. The storage unit 44 stores the image generation program 45, various other information, and the like. Specific examples of the storage unit 44 include an HDD and an SSD.

The I/F unit 43 communicates various types of information with the drawing device 10 by wireless communication or wired communication. The display 46 and the input device 48 function as user interfaces. The display 46 displays a captured image obtained being captured by the camera 47 in a live view and provides various types of information related to drawing. The display 46 is not particularly limited, and examples thereof include a liquid crystal monitor and an LED monitor. Further, the input device 48 is operated by the imaging user for inputting various instructions related to drawing. The input device 48 is not particularly limited, and examples thereof include a keyboard, a touch pen, and a mouse. The input device 48 of the present embodiment includes a shutter button of the camera 47. The smartphone 12 adopts a touch panel display in which the display 46 and the input device 48 are integrated.

Figure 5:
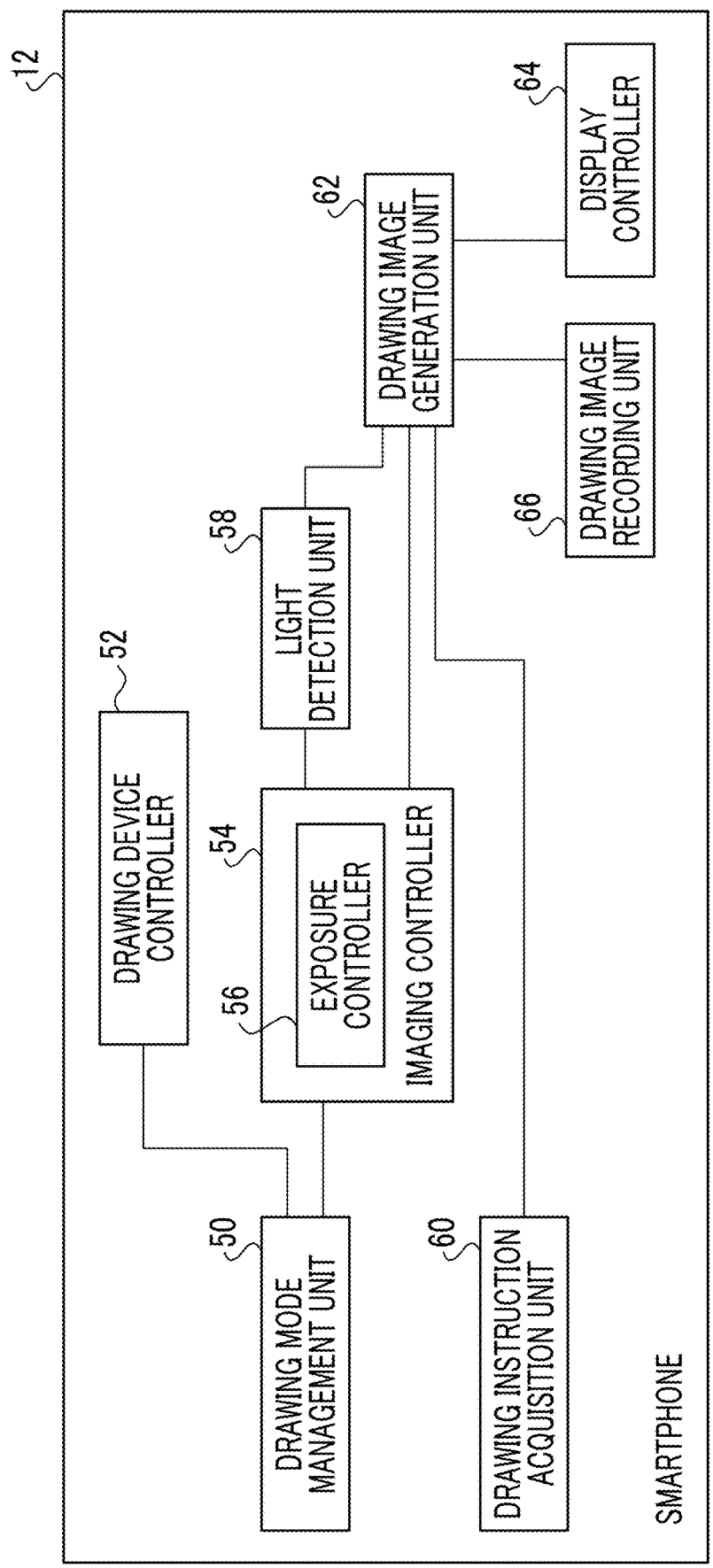
FIG. 5 is a functional block diagram showing an example of a configuration of a smartphone according to a first embodiment.

FIG. 5 shows a functional block diagram representing an example of a configuration related to the function of the smartphone 12 of the present embodiment. As shown in FIG. 5, the smartphone 12 includes a drawing mode management unit 50, a drawing device controller 52, an imaging controller 54, a light detection unit 58, a drawing instruction acquisition unit 60, a drawing image generation unit 62, a display controller 64, and a drawing image recording unit 66. As an example, in the smartphone 12 according to the present embodiment, by the processor 40 executing the image generation program 45 stored in the storage unit 44, the processor 40 functions as the drawing mode management unit 50, the drawing device controller 52, the imaging controller 54, the light detection unit 58, the drawing instruction acquisition unit 60, the drawing image generation unit 62, the display controller 64, and the drawing image recording unit 66.

The drawing mode management unit 50 has a function of managing the transition to the drawing mode and the end of the drawing mode. As an example, in a case where the drawing mode management unit 50 of the present embodiment receives a transition instruction to the drawing mode described in detail later, which is performed by the imaging user using the input device 48, the drawing mode management unit 50 performs the transition to the drawing mode. Further, in a case where the drawing mode management unit 50 receives an end instruction of the drawing mode described in detail later, which is performed by the imaging user using the input device 48, the drawing mode management unit 50 ends the drawing mode.

The drawing device controller 52 has a function of controlling the drawing device 10. As an example, in a case where the drawing device controller 52 of the present embodiment performs the transition to the drawing mode, the drawing device controller 52 outputs a lighting instruction for lighting a light source 26 of the drawing device 10. Further, in a case where the drawing device controller 52 ends the drawing mode, the drawing device controller 52 outputs an extinguishing instruction for extinguishing the light source 26 of the drawing device 10.

The imaging controller 54 includes an exposure controller 56 and has a function of controlling a capturing of the captured image by the camera 47. As an example, the camera 47 of the present embodiment includes an imaging element (not shown) such as a complementary metal oxide semiconductor (CMOS), and is capable of capturing an RGB color image. In the present embodiment, an image that is captured by the imaging element of the camera 47 is referred to as a "captured image". During the drawing mode, the imaging controller 54 captures a captured image of a plurality of frames as a moving image.

The exposure controller 56 has a function of controlling the exposure in capturing the captured image by the camera 47. As an example, the exposure controller 56 of the present embodiment has a function of adjusting the exposure by adjusting at least one of a shutter speed or a stop of the camera 47.

The light detection unit 58 has a function of detecting the light of the light source 26 of the drawing device 10 from the captured image, which is captured by the camera 47. Strictly speaking, the light detection unit 58 has a function of detecting an image representing the light of the light source 26, which is included in the captured image. For example, since the drawing user draws in space by moving the drawing device 10 in a state where the light source 26 is lit, the light detection unit 58 detects the trajectory of the light source 26 from a series of captured images. In the present embodiment, as described above, the color and the luminance of the light are predetermined for the light source 26 of the drawing device 10. Therefore, the light detection unit 58 detects the light of the light source 26 from the captured image based on the predetermined color and luminance of the light. A detection status of the light detected by the light detection unit 58 is output to the light detection unit 58 and the drawing image generation unit 62.

The drawing instruction acquisition unit 60 has a function of acquiring a drawing instruction output from the drawing device 10. Specifically, the drawing instruction acquisition unit 60 acquires a drawing start instruction and a drawing end instruction output from the drawing device 10 and input to the smartphone 12. The drawing start instruction and the drawing end instruction, which are acquired by the drawing instruction acquisition unit 60, are output to the drawing image generation unit 62.

The drawing image generation unit 62 has a function of generating a drawing image based on the detection status of the light detection unit 58. As an example, the drawing image generation unit 62 of the present embodiment generates the drawing image by drawing an image, which follows a drawing condition instructed by the imaging user using the input device 48, according to the trajectory of the light of the light source 26 of the drawing device 10 detected by the light detection unit 58. The drawing condition, which is instructed by the imaging user using the input device 48, includes at least one of color, lightness, thickness, or a line type such as a dotted line or a solid line of drawn lines, but it is not particularly limited. For example, in a case where "pink", "thick line", "high lightness", and "solid line" is instructed as the drawing condition by the imaging user, the drawing image generation unit 62 draws a thick and solid line in high-lightness pink according to the trajectory of the light detected by the light detection unit 58. In the following, for convenience of explanation, a case where the drawing image generation unit 62 draws a line drawing according to the trajectory of the light will be described below.

The display controller 64 has a function of displaying the drawing image, which is generated by the drawing image generation unit 62, on the display 46. During the drawing mode, the display controller 64 of the present embodiment displays the drawing image, which is generated by the drawing image generation unit 62, on the display 46 as a live view image of the camera 47.

The drawing image recording unit 66 has a function, regarding the drawing image generated by the drawing image generation unit 62, of correcting the brightness of the background region, which is a background of the light detected by the light detection unit 58, and recording the drawing image in which the brightness is corrected to the storage unit 44. As an example, in a case where the drawing mode ends, the drawing image recording unit 66 of the present embodiment corrects the brightness of the background region, which became darker due to the reduction of the exposure by the exposure controller 56, by increasing the sensitivity of the drawing image. A method of increasing the sensitivity by the drawing image generation unit 62 includes increasing a gain of the drawing image by a predetermined amount. In other words, a method of increasing the sensitivity by the drawing image generation unit 62 includes increasing a signal value of each pixel of the drawing image by a predetermined amount. The drawing image recording unit 66 may correct the brightness of only the background region of the drawing image or may correct the entire drawing image.

Next, an operation of the space drawing system 1 according to the present embodiment will be described.

Figure 6:
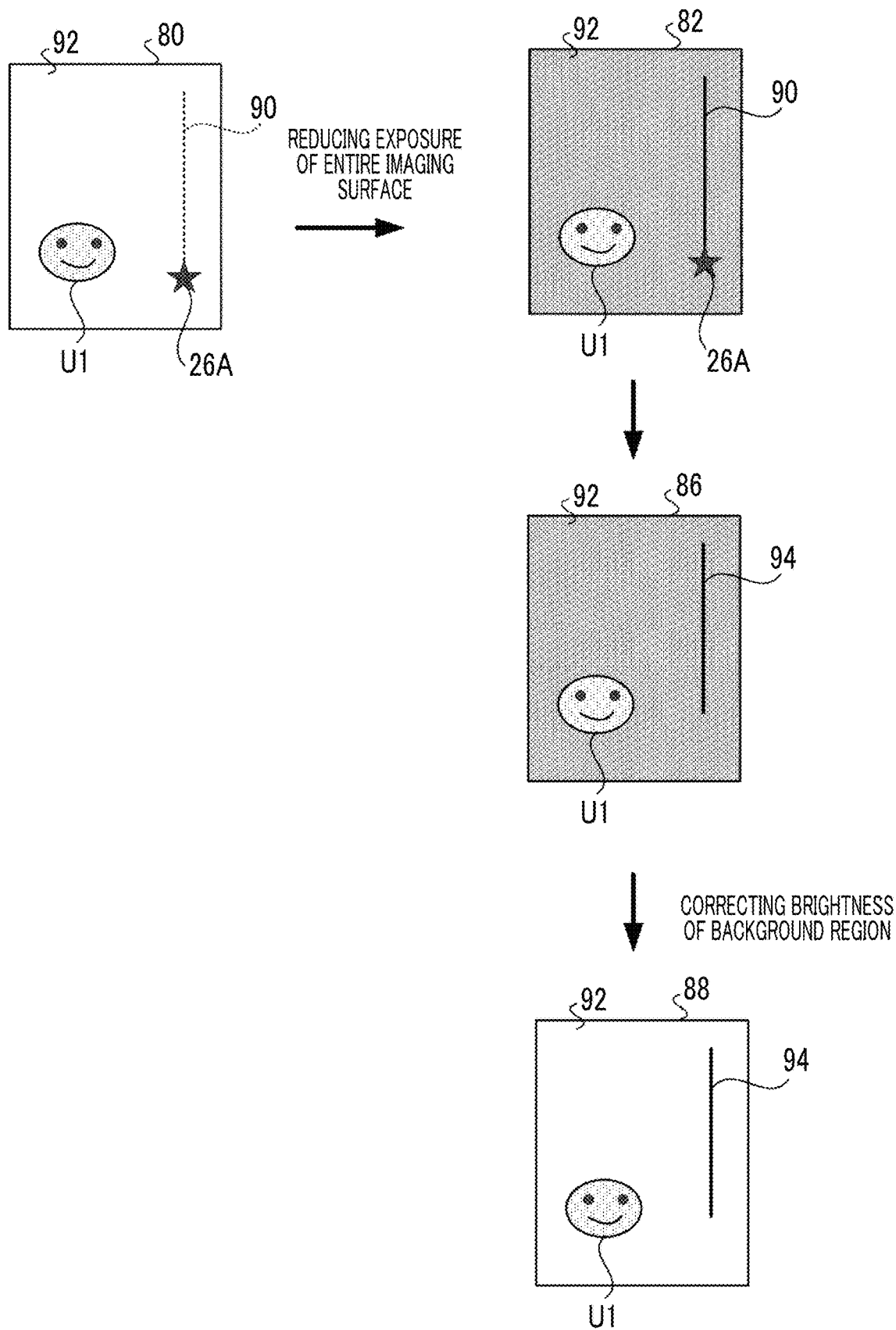
FIG. 6 is a diagram for describing an operation of the first embodiment.

As shown in FIG. 6, in a case where the drawing user performs a drawing using the drawing device 10 in a state where the light source 26 is lit, the captured image 80, which is captured by the camera 47 of the smartphone 12, includes the light of the light source 26A. The captured image 80 shown in FIG. 6 includes a drawing user U1 representing an image of the drawing user, a light source 26A representing an image of the light source 26, a trajectory 90 of light representing an image of the trajectory of the light, and the background region 92. In a case where the surrounding environment, which is a background, is relatively bright, and a difference between the brightness of the surroundings and the brightness of the light source 26 is relatively small, the light detection unit 58 may not be capable of detecting the trajectory 90 of the light from the captured image 80 in some cases.

Therefore, in a case where the exposure controller 56 performs adjustment of reducing the exposure of the entire imaging surface, the captured image 82 becomes dark as a whole, as shown in FIG. 6. Since the light source 26 is brighter and has higher luminance as compared with the surrounding environment, in the captured image 82, the trajectory 90 of the light has relatively higher luminance than that of the background region 92. As a result, the light detection unit 58 can detect the trajectory 90 of the light from the captured image 82.

However, in the captured image 82, the background region 92 becomes darker than the original brightness. For example, in the example shown in FIG. 6, the background region 92 in the captured image 82 is darker than the background region 92 in the captured image 80. Therefore, in the drawing image 86, which is generated by the drawing image generation unit 62 by detecting the trajectory 90 of the light from the captured image 82, although a line drawing 94 is accurately drawn according to the trajectory 90 of the light, the background region 92 becomes dark. Therefore, the drawing image recording unit 66 corrects and brightens the brightness of the background region 92 in the drawing image 86 as described above. For example, the drawing image recording unit 66 corrects the brightness of the background region 92 in the drawing image 86 to a brightness that is equal to the brightness of the background region 92 in the captured image 80 before reducing the exposure, and generates a drawing image 88 in which the brightness of the background region 92 is corrected. It should be noted that, here, "equal" means that an error or the like is allowed, and is not limited to a perfect match. As shown in FIG. 6, in the drawing image 88, the line drawing 94 is drawn with high accuracy according to the trajectory 90 of the light, and the background region 92 becomes bright. The drawing image recording unit 66 records the drawing image 88 after correcting the brightness of the background region 92 in the storage unit 44.

Figure 7:
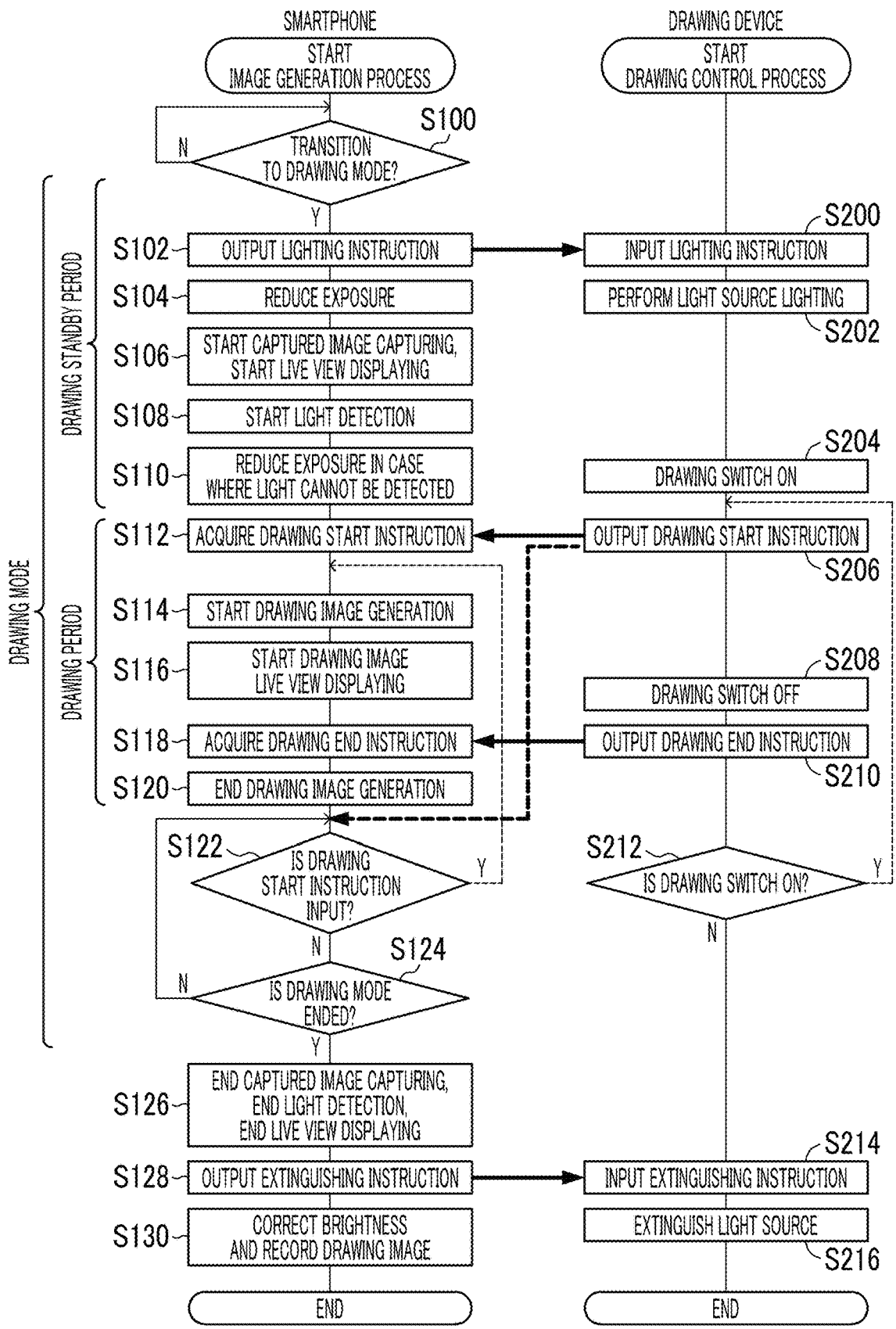
FIG. 7 is a flowchart illustrating an example of an image generation process executed by the smartphone and a drawing control process executed by the drawing device according to the first embodiment.

Furthermore, each operation of the smartphone 12 and the drawing device 10 will be described. FIG. 7 is a flowchart illustrating an example of an image generation process executed by the smartphone 12 and a drawing control process executed by the drawing device 10. The smartphone 12 executes the image generation process shown in FIG. 7 by executing the image generation program 45 stored in the storage unit 44. Further, the drawing device 10 executes the drawing control process shown in FIG. 7 by executing the drawing control program 25 stored in the storage unit 24.

In a case where drawing is performed by the space drawing system 1, first, the imaging user instructs the input device 48 of the smartphone 12 to make a transition to the drawing mode.

Therefore, in the smartphone 12, in step S100, the drawing mode management unit 50 determines whether or not to make a transition to the drawing mode. The determination in step S100 is determined to be negative until the instruction to make a transition to the drawing mode is performed. On the other hand, in a case where the instruction to make a transition to the drawing mode is performed, the transition to the drawing mode is made, the determination in step S100 is determined to be positive, and the process proceeds to step S102. A period from the next step S102 until the drawing start instruction is input (see step S112) is a drawing standby period.

In step S102, the drawing device controller 52 outputs a lighting instruction to the drawing device 10. In a case where the lighting instruction is output from the smartphone 12, in the drawing device 10, the lighting instruction is input in step S200, and the lighting controller 30 lights the light source 26 in the next step S202.

In the smartphone 12, in the next step S104, the exposure controller 56 reduces the exposure of the camera 47 as described above. As an example, in the present embodiment, the camera 47 normally reduces the exposure by a predetermined amount from the standard exposure (standard exposure) specified for imaging according to the imaging environment. Specifically, how much the exposure is reduced may be determined by design or experimentally, depending on the imaging element of the camera 47 or the like, and based on the brightness of the entire imaging surface at which the light of the light source 26 can be detected.

In the next step S106, the imaging controller 54 starts the capture of the captured image by using the camera 47. The camera 47 captures a plurality of captured images at a predetermined frame rate in accordance with the control of the imaging controller 54. Further, the imaging controller 54 starts the display of the captured image on the display 46 as a live view image.

In the next step S108, the light detection unit 58 starts the detection of the light of the light source 26 from the captured image. In the next step S110, the exposure controller 56 performs control to further reduce the exposure of the camera 47 in a case where the light detection unit 58 cannot detect the light of the light source 26 from the captured image. For example, in a case where the imaging environment is too bright compared to the assumed environment, the light of the light source 26 may not be detected from the captured image, which is captured by reducing the exposure in step S104. Therefore, in the present embodiment, in step S110, the exposure controller 56 performs control to further reduce the exposure of the camera 47. The extent to which the exposure of the camera 47 is reduced is not particularly limited, and for example, the exposure may be reduced until the light of the light source 26 can be detected from the captured image. Further, for example, in a case where a lower limit value is set and the light of the light source 26 cannot be detected from the captured image even after the lower limit value of the exposure reaches, a warning or the like may be notified.

As described above, in the smartphone 12, the exposure of the camera 47 is controlled during the drawing standby period, and the light of the light source 26 can be detected from the captured image.

On the other hand, in the drawing device 10, in a case where the drawing is ready after the light source 26 is lit, the drawing switch 28A is operated to enter an ON state. In step S204, in a case where the switch state reception unit 32 receives the fact that the drawing switch 28A enters an ON state, in the next step S206, the drawing instruction output unit 34 outputs the drawing start instruction to the smartphone 12.

In a case where the drawing start instruction is output from the drawing device 10, in the smartphone 12, in step S112, the drawing instruction acquisition unit 60 acquires the drawing start instruction input to the smartphone 12. In a case where the drawing instruction acquisition unit 60 acquires the drawing start instruction, the drawing standby period ends, the transition is made to the drawing period, and drawing is in progress.

In the next step S114, as described above, the drawing image generation unit 62 starts the generation of the drawing image based on the detection status of the light detection unit 58. In the next step S116, the display controller 64 starts the display of the drawing image generated by the drawing image generation unit 62 on the display 46 as a live view image. The drawing image, which is generated in step S114, is an image in which the background region 92 is in a dark state as in the drawing image 86 (see FIG. 6) described above due to the reduction of the exposure of the camera 47 in step S108 or the like. Therefore, the background region of the drawing image displayed on the display 46 as a live view image is in a dark state.

As described above, in the smartphone 12, during the drawing period, the drawing image generation unit 62 generates a drawing image based on the detection status of the light detected by the light detection unit 58 from the captured image, which is captured by the camera 47, and the drawing image is displayed on the display 46 as a live view image.

On the other hand, in a case where the drawing is ended, or in a case where the drawing is temporarily stopped, the drawing user, who performs a drawing using the drawing device 10, operates the drawing switch 28A to make an OFF state. In step S208, in a case where the switch state reception unit 32 receives the fact that the drawing switch 28A enters an OFF state, in the next step S210, the drawing instruction output unit 34 outputs the drawing end instruction to the smartphone 12.

In a case where the drawing end instruction is output from the drawing device 10, in the smartphone 12, in step S118, the drawing instruction acquisition unit 60 acquires the drawing end instruction input to the smartphone 12. In a case where the drawing instruction acquisition unit 60 acquires the drawing end instruction, in the next step S120, the drawing image generation unit 62 ends the generation of the drawing image. In a case where the drawing image generation unit 62 ends the generation of the drawing image, the drawing period is ended.

In a case where the drawing user, who performs a drawing using the drawing device 10, wants to perform a drawing in another region of the imaging space, or the like, the drawing user temporarily makes the drawing switch 28A an OFF state, moves the drawing device 10 to another region where the drawing user wants to draw, makes the drawing switch 28A an ON state again, and starts performing a drawing. Therefore, the switch state reception unit 32 of the drawing device 10 determines whether or not the fact that the drawing switch 28A is in an ON state is received. In a case where the fact that the drawing switch 28A is in an ON state is not received, the determination in step S212 is determined to be negative, and the process proceeds to step S214. On the other hand, in a case where the fact that the drawing switch 28A is in an ON state is received, the determination in step S212 is determined to be positive, the process returns to step S206, and the processes of steps S206 to S210 are repeated.

Therefore, the smartphone 12 determines whether or not the drawing start instruction is input in step S122 after the generation of the drawing image is ended in step S120. As described above, in a case where the drawing user makes the drawing switch 28A in an ON state again, the drawing start instruction is output again from the drawing device 10 to the smartphone 12. In a case where the drawing instruction acquisition unit 60 acquires the drawing start instruction again, the determination in step S122 is determined to be positive, the process returns to step S114, the transition is made to the drawing period again, and the processes of steps S114 to S120 are repeated. On the other hand, in a case where the drawing instruction acquisition unit 60 does not acquire the drawing start instruction, the determination in step S122 is determined to be negative, and the process proceeds to step S124.

In step S124, the drawing mode management unit 50 determines whether or not to end the drawing mode. As an example, in the present embodiment, in a case where the imaging user presses a shutter button included in the input device 48, the drawing mode is ended. Therefore, in a case where the shutter button is not pressed, the determination in step S124 is determined to be negative, and the process returns to step S122. On the other hand, in a case where the shutter button is pressed, the determination in step S124 is determined to be positive, and the process proceeds to step S126.

In step S126, the imaging controller 54 ends the capturing of the captured image by the camera 47, and the light detection unit 58 ends the detection of the light. Further, the display controller 64 ends the display of the live view image displayed on the display 46.

In next step S128, the drawing device controller 52 outputs an extinguishing instruction to the drawing device 10. In a case where the extinguishing instruction is output from the smartphone 12, in the drawing device 10, the extinguishing instruction is input in step S214, and the lighting controller 30 extinguishes the light source 26 in the next step S216. In a case where the process in step S216 is ended, the drawing control process shown in FIG. 7 is ended in the drawing device 10.

On the other hand, in the smartphone 12, in the next step S130, the drawing image recording unit 66 corrects the brightness of the background region of the drawing image and records the drawing image, in which the brightness is corrected, in the storage unit 44. As in the drawing image 88 (see FIG. 6) described above, the drawing image recording unit 66 of the present embodiment corrects the brightness of the background region, which became darker due to the reduction of the exposure, to be the same as the brightness of the captured image captured with the standard exposure by increasing the sensitivity of the drawing image. In a case where the process of step S130 is ended, in the smartphone 12, the image generation process shown in FIG. 7 is ended. The drawing image, in which the brightness is corrected, may be displayed on the display 46 before the image generation process is ended.

As described above, the smartphone 12 of the present embodiment includes the camera 47 that captures the light emitted from the drawing device 10 and a processor 40 that is configured to generate a drawing image based on the detection status in which the light is detected from the captured image, which is captured by the camera 47. The processor 40 is configured to cause the camera 47 to change an exposure of the entire imaging surface to capture the captured image, detect the light from the captured image, which is captured in a state in which the exposure is changed, and record the drawing image, which is generated based on the detection status of the light, by correcting a brightness of a background region, which is a background of the light.

As described above, in the smartphone 12 of the present embodiment, since the brightness of the background image of the drawing image, which became darker due to the reducing of the exposure, is corrected, it is possible to obtain a high quality drawing image even in the background region.

SECOND EMBODIMENT

In the first embodiment, the brightness of the background region of the drawing image is corrected, whereas in the present embodiment, a form of obtaining a drawing image with high quality even in the background region by capturing an image of the background region without reducing the exposure will be described.

Since a configuration of the drawing device 10 according to the present embodiment is the same as that of the first embodiment (see FIGS. 2 and 3), the description thereof will be omitted.

Figure 8:
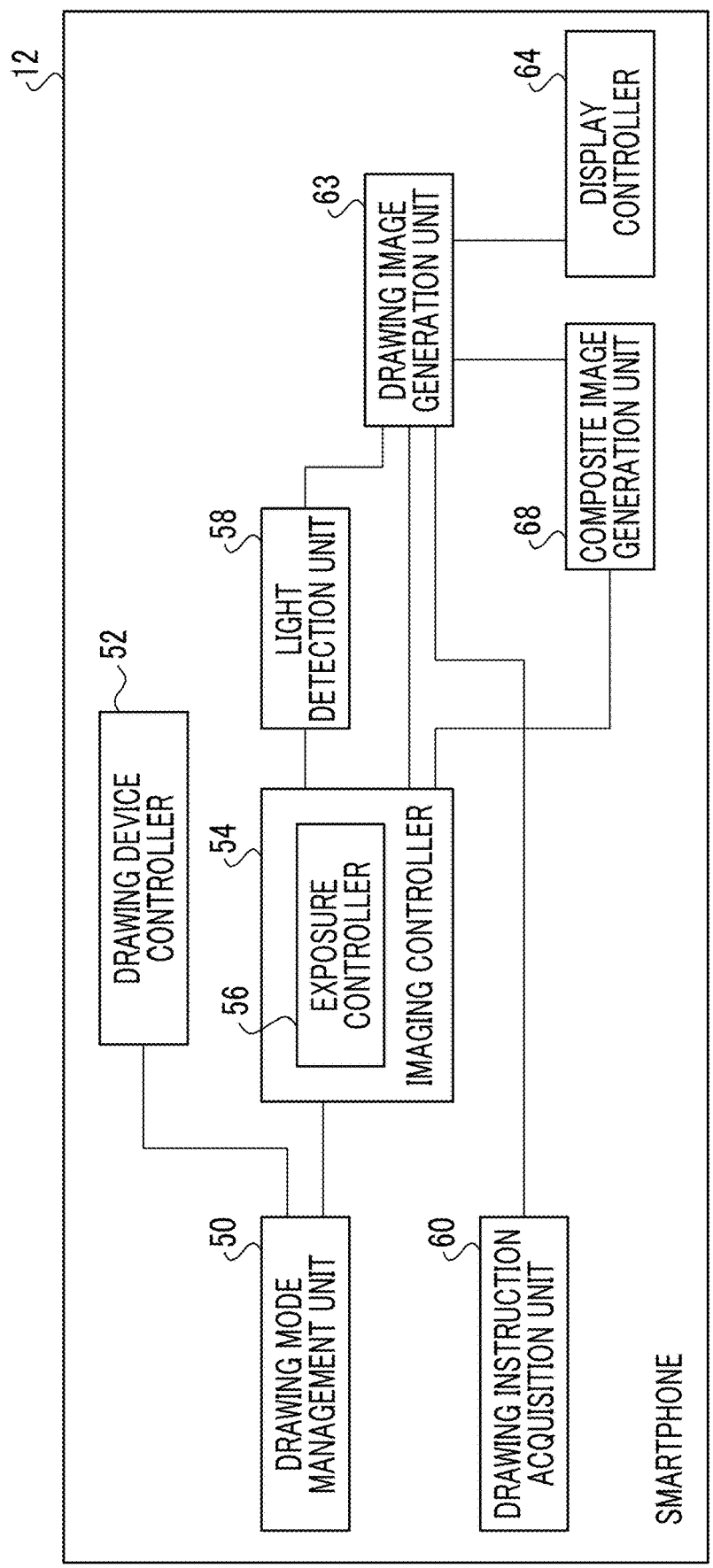
FIG. 8 is a functional block diagram showing an example of a configuration of a smartphone according to a second embodiment.

On the other hand, the smartphone 12 has the same hardware configuration as that of the first embodiment (see FIG. 4), but the functional configuration is partially different. FIG. 8 shows a functional block diagram representing an example of a configuration related to the function of the smartphone 12 of the present embodiment. As shown in FIG. 8, the smartphone 12 differs from the smartphone 12 (see FIG. 5) of the first embodiment in that a drawing image generation unit 63 is provided instead of the drawing image generation unit 62 and a composite image generation unit 68 is provided instead of the drawing image recording unit 66.

The drawing image generation unit 63 of the present embodiment is the same as the drawing image generation unit 62 of the first embodiment in that it has a function of generating a drawing image based on a detection status of the light detection unit 58. However, the drawing image generation unit 63 of the present embodiment has a function of storing only a drawing corresponding to the detection status of the light as the drawing image. As an example, during the drawing period, the display controller 64 of the present embodiment superimposes a drawing image, which is obtained only with a drawing corresponding to the detection status of the light, on the captured image and displays the superimposed image on the display 46 as a live view image.

Further, the composite image generation unit 68 has a function of generating a composite image obtained by composing a drawing image, which is generated by the drawing image generation unit 63 and which includes only a drawing corresponding to the detection status of the light, and a captured image, which is captured by the camera 47 with proper exposure, as a drawing image including a background.

Figure 9:
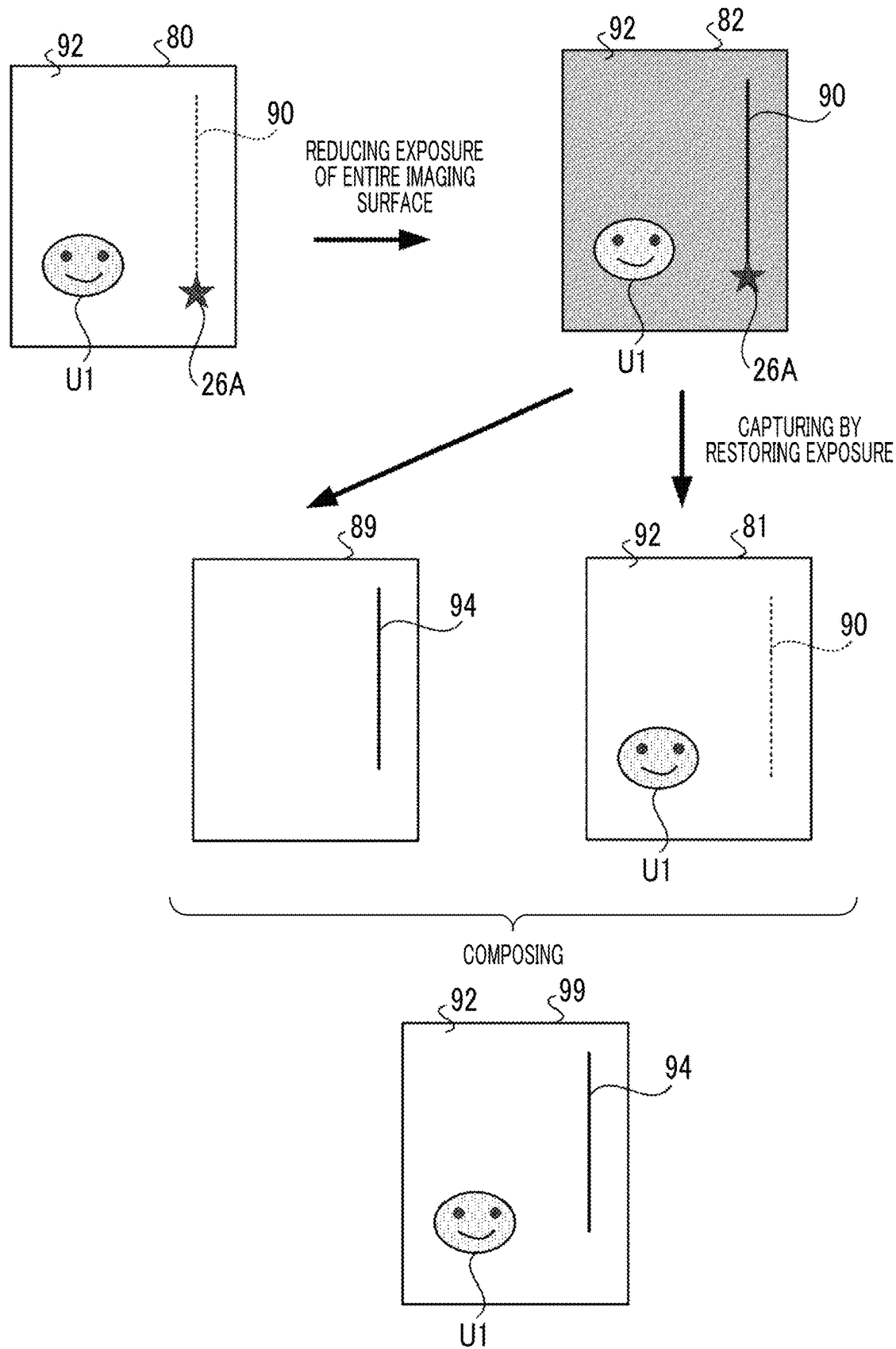
FIG. 9 is a diagram for describing an operation of the second embodiment.

An operation of the space drawing system 1 according to the present embodiment will be described with reference to FIG. 9.

Similar to the description with reference to FIG. 6 in the first embodiment, in a case where the trajectory 90 of the light cannot be detected from the captured image 80, by reducing the exposure of the entire imaging surface and obtaining the captured image 82, the trajectory 90 of the light can be detected.

The drawing image generation unit 62 of the present embodiment stores only the drawing corresponding to the detection status of the trajectory 90 of the light as the drawing image 89 as one layer. The drawing image 89 does not include a background image.

On the other hand, in a case where the drawing mode is ended, the exposure controller 56 restores the exposure to the original state, and then the imaging controller 54 causes the camera 47 to capture the captured image. Therefore, although it is difficult to see the trajectory 90 of the light in the captured image 81, the background region 92 has the same brightness as before the exposure of the entire imaging surface is reduced. Therefore, the composite image generation unit 68 generates a composite image 99 by composing the drawing image 89 and the captured image 81. In the composite image 99, the line drawing 94 is accurately drawn according to the trajectory 90 of the light, and the background region 92 has the original brightness.

Figure 10:
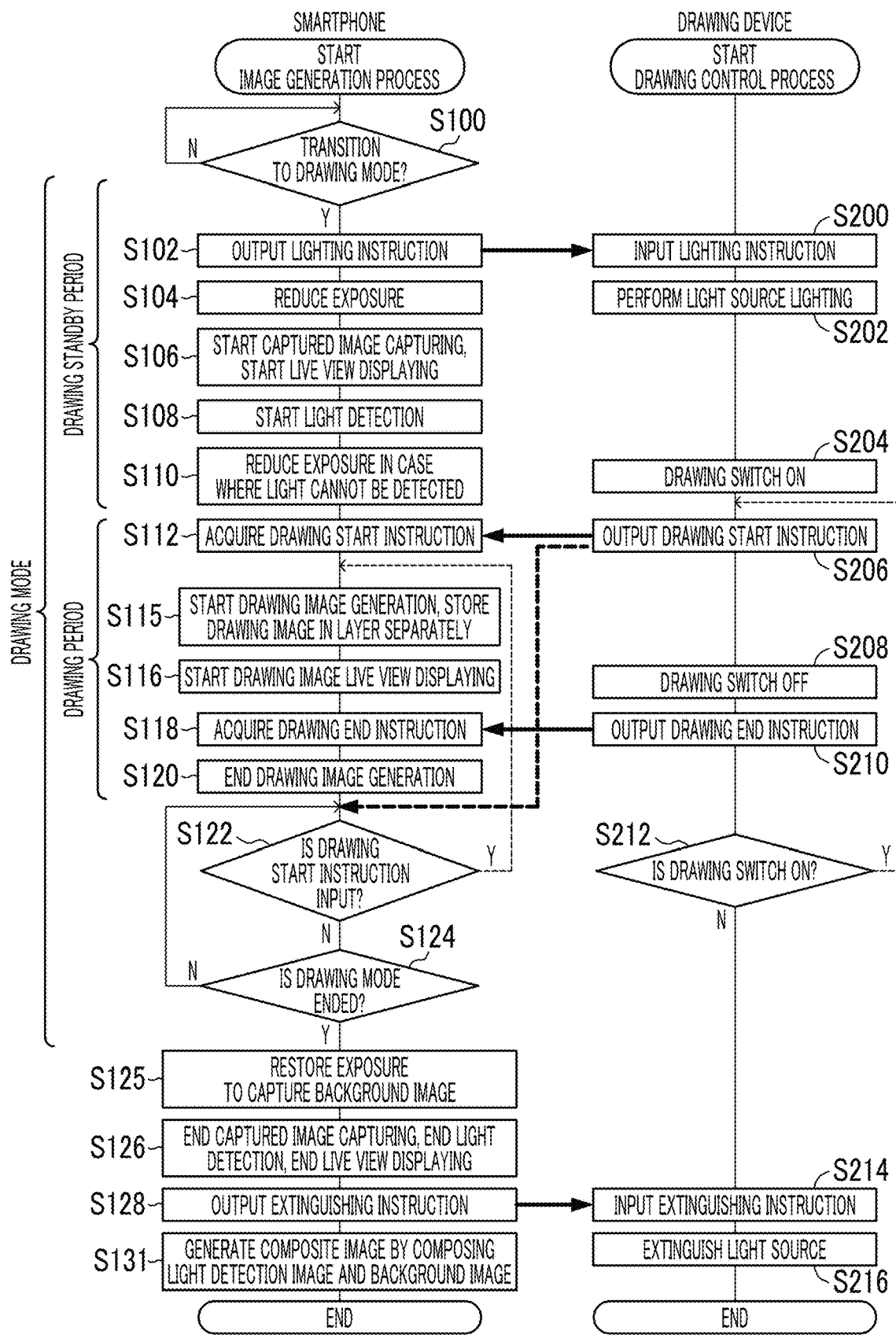
FIG. 10 is a flowchart illustrating an example of an image generation process executed by the smartphone and a drawing control process executed by the drawing device according to the second embodiment.

Furthermore, each operation of the smartphone 12 and the drawing device 10 of the present embodiment will be described. FIG. 10 is a flowchart illustrating an example of an image generation process executed by the smartphone 12 and a drawing control process executed by the drawing device 10. Note that the drawing control process, which is executed by the drawing device 10, is the same as the drawing control process (see FIG. 7) executed by the drawing device 10 of the first embodiment, and thus the description thereof will be omitted. On the other hand, an image generation process, which is executed by the smartphone 12, differs from the image generation process executed by the smartphone 12 of the first embodiment (see FIG. 7) in that step S115 is provided instead of step S114 as shown in FIG. 10, a process of step S125 is provided between steps S124 and S126, and a process of step S131 is provided instead of step S130.

In the smartphone 12 of the present embodiment, in step S115, in a case where the drawing image generation unit 63 starts the generation of the drawing image, as described above, only the drawing corresponding to the detection status of the light is stored as the drawing image in a layer separate from the background image.

Further, in step S125, in a case where the drawing mode is ended, the imaging controller 54 restores the exposure of the camera 47 by the exposure controller 56 to capture the background image as the captured image. As an example, the exposure controller 56 restores the exposure of the camera 47 to the standard exposure before reducing the exposure in step S104.

Further, in step S131, as mentioned above, the composite image generation unit 68 generates a composite image by composing the drawing image, which is generated by the drawing image generation unit 63, which is stored as a separate layer, and which includes only a drawing corresponding to the detection status of the light, and the captured image that is a background image captured in step S125. The generated composite image is stored in the storage unit 44. In a case where the process of step S131 is ended, in the smartphone 12, the image generation process shown in FIG. 10 is ended.

As described above, the smartphone 12 of the present embodiment includes the camera 47 that captures the light emitted from the drawing device 10 and a processor 40 that is configured to generate a drawing image based on the detection status in which the light is detected from the captured image, which is captured by the camera 47. The processor 40 is configured to cause the camera 47 to reduce the exposure of the entire imaging surface to capture the captured image, cause the camera to capture the background image, which is a background of the light in the captured image, by increasing the exposure, and generate a composite image by superimposing the drawing image drawn based on the detection status in which the light is detected and the background image.

As described above, in the smartphone 12 of the present embodiment, since the drawing image of only the drawing corresponding to the detection status of the light and the background image captured with the increased exposure are composed, a high quality drawing image can be obtained even in the background region.

THIRD EMBODIMENT

In the first and second embodiments, a form in which the light emitted from the drawing device 10 is easily detected by reducing the exposure of the entire imaging surface of the camera 47 has been described. In contrast, in the present embodiment, a case where the light emitted from the drawing device 10 is easily detected by further increasing the exposure of the entire imaging surface will be described.

Since a configuration of the drawing device 10 according to the present embodiment is the same as that of the first embodiment (see FIGS. 2 and 3), the description thereof will be omitted.

On the other hand, the smartphone 12 has the same hardware configuration as that of the first embodiment (see FIG. 4), but the functions of the exposure controller 56 and the drawing image recording unit 66 are partially different.

As described above, the exposure controller 56 performs adjustment to reduce the exposure of the entire imaging surface in a case where the light of the light source 26 cannot be detected or is difficult to be detected from the captured image because the surrounding environment is bright. Further, the exposure controller 56 of the present embodiment performs adjustment to increase the exposure of the entire imaging surface in a case where the light of the light source 26 cannot be detected or is difficult to be detected from the captured image based on the status of the light source 26 of the drawing device 10.

Further, as described above, in a case where the exposure controller 56 performs the adjustment of reducing the exposure of the entire imaging surface, and in a case where the drawing mode is ended, the drawing image recording unit 66 corrects the brightness of the background region, which became darker due to the reduction of the exposure by the exposure controller 56, by increasing the sensitivity of the drawing image. In a case where the exposure controller 56 performs the adjustment of increasing the exposure of the entire imaging surface, and in a case where the drawing mode is ended, the drawing image recording unit 66 of the present embodiment corrects the brightness of the background region, which became brighter due to the increase of the exposure by the exposure controller 56, by reducing the sensitivity of the drawing image. A method of reducing the sensitivity by the drawing image generation unit 62 includes reducing a gain of the drawing image by a predetermined amount. In other words, a method of reducing the sensitivity by the drawing image generation unit 62 includes reducing a signal value of each pixel of the drawing image by a predetermined amount.

Next, an operation of the space drawing system 1 according to the present embodiment will be described.

Figure 11:
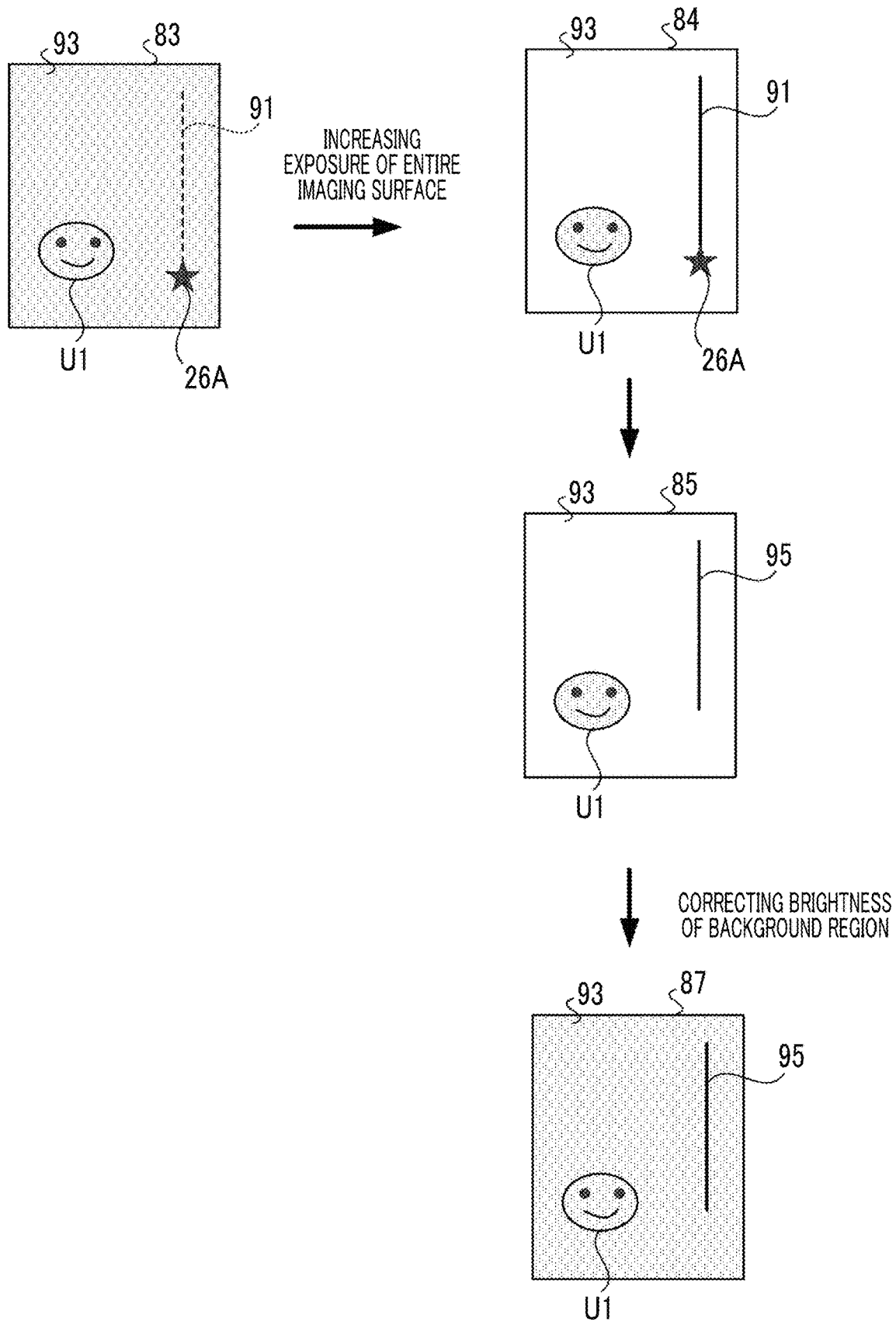
FIG. 11 is a diagram for describing an operation of a third embodiment.

As shown in FIG. 11, in a case where the drawing user performs a drawing using the drawing device 10 in a state where the light source 26 is lit, the captured image 83, which is captured by the camera 47 of the smartphone 12, includes the light of the light source 26A. The captured image 83 shown in FIG. 11 includes a drawing user U1 representing an image of the drawing user, a light source 26A representing an image of the light source 26, a trajectory 91 of light representing an image of the trajectory of the light, and the background region 93. The amount of light emitted from the light source 26 to the camera 47 may be less than the original amount of light. For example, in a case where the amount of light emitted from the light source 26 is less than the original amount due to deterioration over time, failure, or the like, the amount of light emitted from the light source 26 to the camera 47 becomes less than the original amount of light. Further, even in a case where the amount of emitted light is the same as the original amount of light but the surface of the light source 26 is dirty, the amount of light emitted from the light source 26 to the camera 47 becomes less than the original amount of light. In such a case, the light detection unit 58 may not be capable of detecting the trajectory 91 of the light from the captured image 83.

Therefore, in a case where the exposure controller 56 performs adjustment of increasing the exposure of the entire imaging surface, the captured image 84 becomes bright as a whole, as shown in FIG. 11. Since the light source 26 is brighter and has higher luminance as compared with the surrounding environment, in the background region 93, the trajectory 91 of the light has relatively higher luminance than that of the background region 93. As a result, the light detection unit 58 can detect the trajectory 91 of the light from the captured image 84.

However, in the captured image 84, the background region 93 becomes brighter than the original brightness. For example, in the example shown in FIG. 11, the background region 93 in the captured image 83 is brighter than the background region 93 in the captured image 84. Therefore, in the drawing image 85, which is generated by the drawing image generation unit 62 by detecting the trajectory 91 of the light from the captured image 84, although a line drawing 95 is accurately drawn according to the trajectory 91 of the light, the background region 93 becomes dark. Therefore, the drawing image recording unit 66 corrects and darkens the brightness of the background region 93 in the drawing image 85 as described above. For example, the drawing image recording unit 66 corrects the brightness of the background region 93 in the drawing image 85 to a brightness that is equal to the brightness of the background region 93 in the captured image 83 before increasing the exposure, and generates a drawing image 87 in which the brightness of the background region 93 is corrected. It should be noted that, here again, "equal" means that an error or the like is allowed, and is not limited to a perfect match. As shown in FIG. 11, in the drawing image 87, the line drawing 95 is drawn with high accuracy according to the trajectory 91 of the light, and the background region 93 becomes dark. The drawing image recording unit 66 records the drawing image 87 after correcting the brightness of the background region 93 in the storage unit 44.

Figure 12:
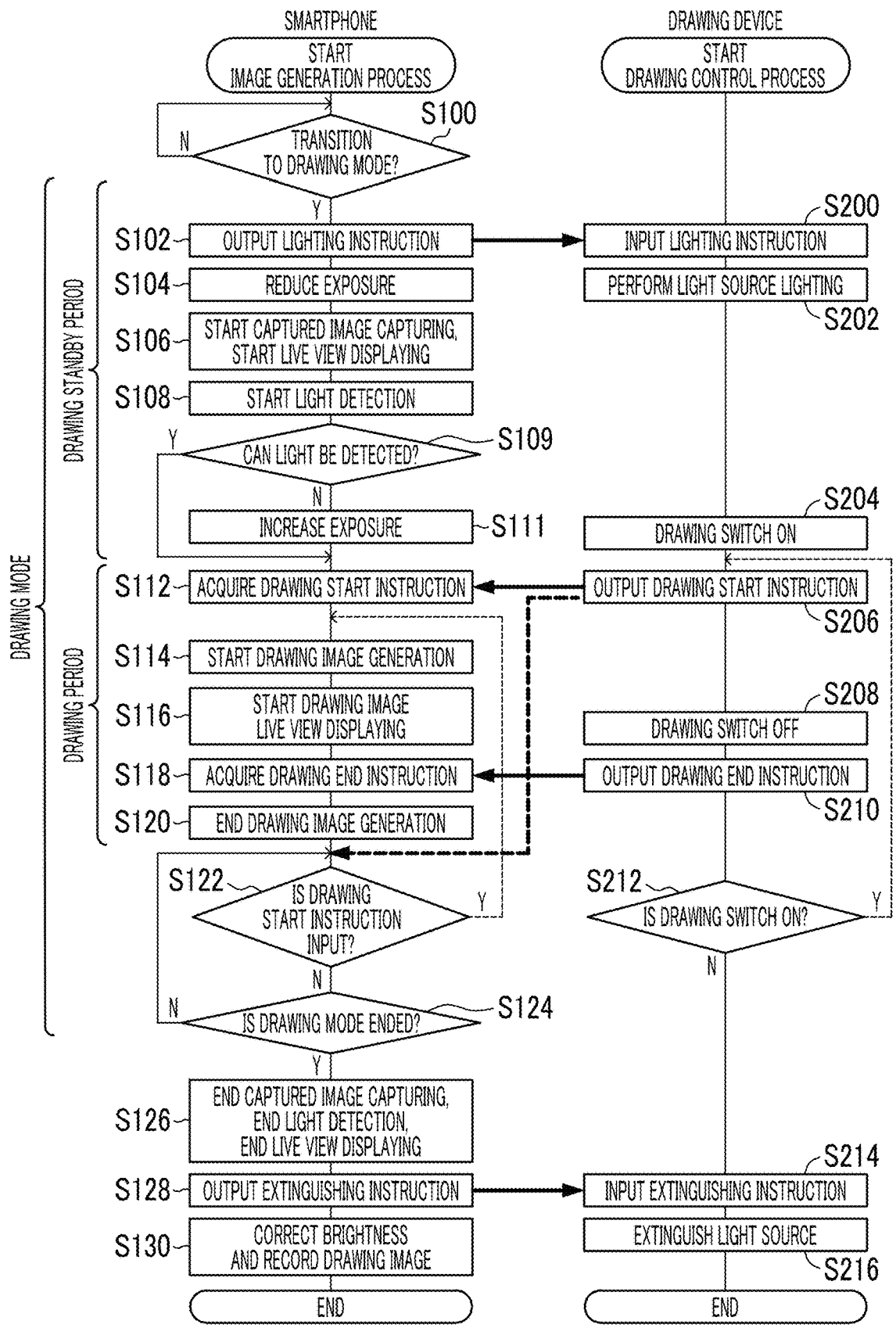
FIG. 12 is a flowchart illustrating an example of an image generation process executed by the smartphone and a drawing control process executed by the drawing device according to the third embodiment.

Furthermore, each operation of the smartphone 12 and the drawing device 10 of the present embodiment will be described. FIG. 12 is a flowchart illustrating an example of an image generation process executed by the smartphone 12 and a drawing control process executed by the drawing device 10. Note that the drawing control process, which is executed by the drawing device 10, is the same as the drawing control process (see FIG. 7) executed by the drawing device 10 of the first embodiment, and thus the description thereof will be omitted. On the other hand, the image generation process, which is executed by the smartphone 12, differs from the image generation process (see FIG. 7) executed by the smartphone 12 of the first embodiment in that steps S109 and S111 are provided instead of step S110 as shown in FIG. 12.

In the smartphone 12 of the present embodiment, in a case where the exposure controller 56 reduces the exposure of the camera 47 as described above in step S104, the exposure is reduced to an assumed lower limit value.

After that, as shown in FIG. 12, in step S109, the light detection unit 58 determines whether or not the light of the light source 26 can be detected from the captured image. In a case where the light of the light source 26 can be detected from the captured image, the determination in step S109 is determined to be positive, and the process proceeds to step S112. On the other hand, in a case where the light of the light source 26 cannot be detected from the captured image, the determination in step S109 is determined to be negative, and the process proceeds to step S111.

As described above, in a case where the light of the light source 26 cannot be detected from the captured image because the amount of light emitted from the light source 26 to the camera 47 is less than the original amount of light, even in a case where the exposure is reduced in this way, the light of the light source 26 cannot be detected from the captured image.

Therefore, in step S111, the exposure controller 56 increases the exposure of the camera 47 as described above. As an example, in the present embodiment, the camera 47 normally increases the exposure to an assumed upper limit value from the standard exposure (standard exposure) specified for imaging according to the imaging environment. The method of increasing the exposure is not limited to the present embodiment. For example, a form of increasing the exposure by a predetermined amount may be used, or specifically how much the exposure is increased may be determined by design or experimentally, depending on the imaging element of the camera 47 or the like, and based on the brightness at which the light of the light source 26 can be detected. Further, a form may be used in which the exposure may be gradually increased, and whether or not the light of the light source 26 can be detected from the captured image is determined each time.

As described above, in the smartphone 12 of the present embodiment, the control of reducing the exposure of the camera 47 (step S104) or the control of increasing the exposure (step S111) is performed during the drawing standby period, thereby the light of the light source 26 can be detected from the captured image.

Therefore, in the present embodiment, in a case where the exposure of the entire imaging surface is reduced by the process in step S104, in step S130, the drawing image recording unit 66 corrects the brightness of the background region, which became darker due to the reduction of the exposure, to be equivalent to the brightness of the captured image, which is captured with the standard exposure, by increasing the sensitivity of the drawing image. Further, in a case where the exposure of the entire imaging surface is increased by the process in step S111, the drawing image recording unit 66 corrects the brightness of the background region, which became brighter due to the increase of the exposure, to be equivalent to the brightness of the captured image, which is captured with the standard exposure, by reducing the sensitivity of the drawing image. In this way, the drawing image recording unit 66 records the drawing image in which the brightness is corrected in the storage unit 44.

As described above, the processor 40 of the smartphone 12 of the present embodiment can detect the light of the light source 26 from the captured image by performing the control of reducing the exposure of the entire imaging surface of the camera 47. Further, in a case where the light of the light source 26 cannot be detected from the captured image even in a case where control is performed to reduce the exposure of the entire imaging surface of the camera 47, the processor 40 can detect the light of the light source 26 from the captured image by performing control of increasing the exposure of the entire imaging surface of the camera 47. Further, the processor 40 is configured to cause 47 the camera to change an exposure of the entire imaging surface to capture the captured image, detect the light from the captured image, which is captured in a state in which the exposure is changed, and record the drawing image, which is generated based on the detection status of the light, by correcting a brightness of a background region, which is a background of the light.

As described above, in the smartphone 12 of the present embodiment, since the brightness of the background image of the drawing image, which became darker due to the reduction of the exposure, is corrected or the brightness of the background image of the drawing image, which became brighter due to increasing of the exposure, is corrected, a high quality drawing image can be obtained even in the background region.

Figure 13:
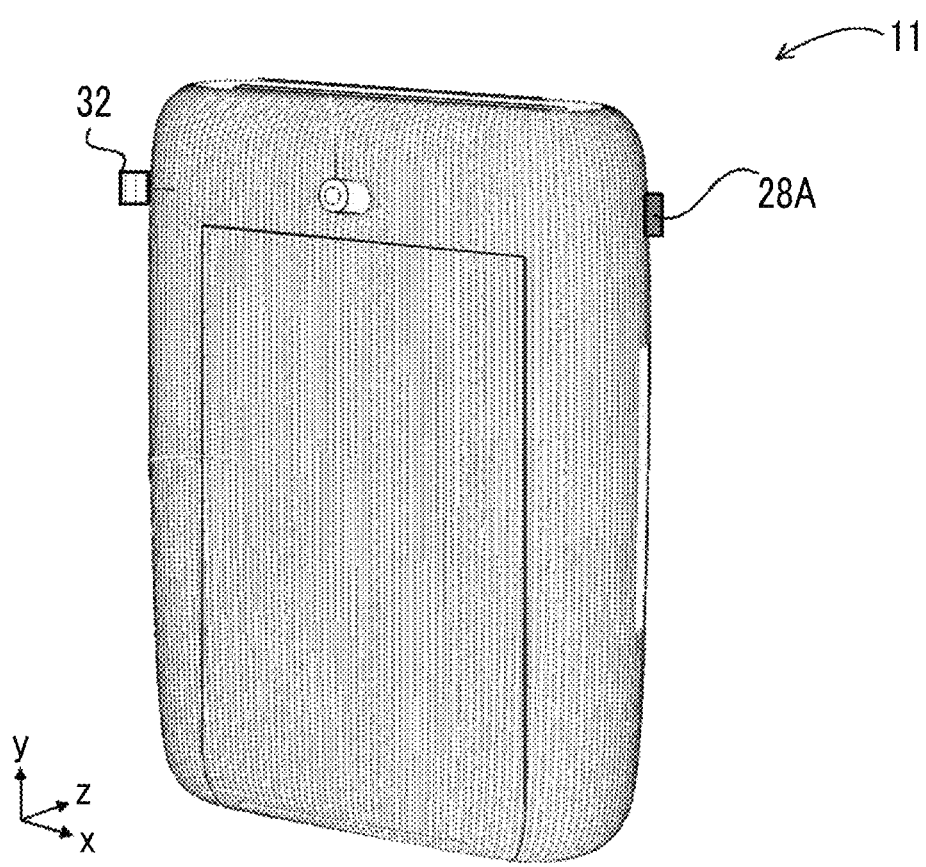
FIG. 13 is a diagram showing another example of a drawing device.

In each of the above-described forms, the case where the drawing device 10 is in a form of a light pen has been described, but a form of the drawing device is not particularly limited, and any instruction device may be used as long as it is capable of instructing drawing with light. For example, as shown in FIG. 13, a drawing device 11 having a print function may be used. The drawing device 11 shown in FIG. 13 has a function of receiving a drawing image generated by the smartphone 12 and printing the received drawing image on an instant film.

Further, the timing of reducing the exposure of the entire imaging surface is not limited to the above-described timing. For example, only one of step S108 and step S110 of the image generation process (see FIGS. 7 and 10) may be performed. Further, for example, a form may be used in which the exposure is reduced only in a case where the light cannot be detected after the detection of the light is started. Further, for example, a form may be used in which the exposure is reduced only in a case where the light cannot be detected as appropriate during the drawing. Further, for example, a form may be used in which a control of reducing the exposure to a state where the light can be detected by calibration before making a transition to the drawing mode, is performed. Further, similarly, the timing of increasing the exposure of the entire imaging surface is not limited to the above-described timing. In the above-described third embodiment, the control of increasing the exposure is performed in a case where the light cannot be detected even in a case where the exposure is reduced, but a form may be used in which only the control of increasing the exposure is performed. For example, in a case where the imaging environment is dark, a form may be used in which only the control of increasing the exposure is performed. Further, for example, a form may be used in which the exposure is increased only in a case where the light cannot be detected after the detection of the light is started. Further, for example, a form may be used in which the exposure is increased only in a case where the light cannot be detected as appropriate during the drawing. Further, for example, a form may be used in which a control of increasing the exposure to a state where the light can be detected by calibration before making a transition to the drawing mode, is performed.

Further, in each of the above-described forms, the embodiment in which the smartphone 12 controls the lighting and extinguishing of the light source 26 of the drawing device 10 has been described, but the present embodiments are not limited thereto, and the drawing device 10 itself may be configured to control at least one of lighting or extinguishing of the light source 26.

Further, in the above-described form, for example, the following various processors can be used as a hardware structure of a processing unit that executes various processes such as the lighting controller 30, the switch state reception unit 32, and the drawing instruction output unit 34 of the drawing device 10, or the drawing mode management unit 50, the drawing device controller 52, the imaging controller 54, the exposure controller 56, the light detection unit 58, the drawing instruction acquisition unit 60, the drawing image generation unit 62, the drawing image generation unit 63, the display controller 64, the drawing image recording unit 66, and the composite image generation unit 68 of the smartphone 12. As described above, the above described various processors include a CPU, which is a general-purpose processor that executes software (programs) and functions as various processing units, a programmable logic device (PLD), which is a processor whose circuit configuration is able to be changed after manufacturing such as a field programmable gate array (FPGA), a dedicated electric circuit, which is a processor having a circuit configuration specially designed to execute specific processing such as an application specific integrated circuit (ASIC), and the like.

One processing unit may be composed of one of these various processors or may be composed of a combination of two or more processors of the same type or different types (for example, a combination of a plurality of FPGAs or a combination of a CPU and an FPGA). Further, a plurality of processing units may be composed of one processor.

As an example of configuring a plurality of processing units with one processor, first, as represented by a computer such as a client or a server, there is a form in which one processor is configured by a combination of one or more CPUs and software, and this processor functions as a plurality of processing units. Second, as represented by a system on chip (SoC) or the like, there is a form in which a processor, which implements the functions of the entire system including a plurality of processing units with one integrated circuit (IC) chip, is used. In this way, the various processing units are configured by using one or more of the above-mentioned various processors as a hardware structure.

Further, as the hardware structure of these various processors, more specifically, an electric circuit (circuitry) in which circuit elements such as semiconductor elements are combined can be used.

Further, in each of the above-described forms, an aspect in which the drawing control program 25 is stored (installed) in the storage unit 24 in advance, and the image generation program 45 is stored (installed) in the storage unit 44 in advance has been described, but the present embodiments are not limited thereto. The drawing control program 25 and the image generation program 45 may be provided in a form recorded in a recording medium such as a compact disc read only memory (CD-ROM), a digital versatile disc read only memory (DVD-ROM), and a universal serial bus (USB) memory. Further, the drawing control program 25 and the image generation program 45 may be provided in a form of being downloaded from an external device via a network.

What is claimed is:

1. An image generation device comprising:
   a camera that is configured to capture an image including light emitted from an instruction device; and
   a processor that is configured to generate a drawing image based on a detection status in which the light is detected from the captured image,
   wherein, to generate the drawing image, the processor is configured to
      cause the camera to reduce an exposure of an entire imaging surface to capture the captured image, by a predetermined amount, from a standard exposure specified for imaging according to an imaging environment of the camera,
      detect the light from the captured image, which is captured in a state in which the exposure is reduced by the predetermined amount, and
      record the drawing image, which is generated based on the detection status of the light, by correcting a brightness of a background region, which is a background of the detected light.

2. The image generation device according to claim 1, wherein the processor is configured to adjust a sensitivity based on an amount of change in the exposure of the entire imaging surface.

3. The image generation device according to claim 1, wherein the brightness of the background region is equal to a brightness of the captured image obtained immediately before reducing the exposure of the entire imaging surface.

4. The image generation device according to claim 1, wherein the processor is configured to
   cause the camera to change an exposure of an entire imaging surface to capture the captured image,
   cause the camera to capture a background image, which is a background of the light in the captured image, by adjusting the exposure, and
   generate a composite image by composing the drawing image drawn based on the detection status in which the light is detected and the background image.

5. The image generation device according to claim 4, wherein the processor is configured to cause the camera to capture the background image by restoring the exposure to a state before changing the exposure of the entire imaging surface.

6. The image generation device according to claim 4, wherein the processor is configured to
receive an instruction of making a transition to a drawing mode used for generating the drawing image, and
change the exposure of the entire imaging surface from the standard exposure specified according to the imaging environment in a case in which the transition to the drawing mode is made based on the instruction.

7. The image generation device according to claim 6, wherein the processor is configured to transmit a light emission instruction signal used for causing the instruction device to emit the light in a case in which the instruction is received.

8. The image generation device according to claim 4, wherein the processor is configured to change the exposure of the entire imaging surface in a case in which the light is not capable of being detected from the captured image.

9. The image generation device according to claim 8, wherein changing the exposure of the entire imaging surface means changing the exposure in a direction of reducing the exposure.

10. The image generation device according to claim 4, wherein the processor is configured to change the exposure of the entire imaging surface by adjusting at least one of a shutter speed or a stop of the camera.

11. The image generation device according to claim 4, wherein the light is light having a predetermined wavelength, and
the processor is configured to detect the light from the captured image based on a luminance of the light and color corresponding to the predetermined wavelength.

12. The image generation device according to claim 4, wherein the instruction device is a drawing device for a space drawing.

13. The image generation device according to claim 4, wherein the instruction device has a print function of printing the drawing image generated by the image generation device.

14. The image generation device according to claim 1, wherein the processor is configured to
receive an instruction of making a transition to a drawing mode used for generating the drawing image, and
change the exposure of the entire imaging surface from the standard exposure specified according to the imaging environment in a case in which the transition to the drawing mode is made based on the instruction.

15. The image generation device according to claim 14, wherein the processor is configured to transmit a light emission instruction signal used for causing the instruction device to emit the light in a case in which the instruction is received.

16. The image generation device according to claim 1, wherein the processor is configured to change the exposure of the entire imaging surface in a case in which the light is not capable of being detected from the captured image.

17. The image generation device according to claim 16, wherein changing the exposure of the entire imaging surface means changing the exposure in a direction of reducing the exposure.

18. The image generation device according to claim 1, wherein the processor is configured to change the exposure of the entire imaging surface by adjusting at least one of a shutter speed or a stop of the camera.

19. The image generation device according to claim 1, wherein the light is light having a predetermined wavelength, and
the processor is configured to detect the light from the captured image based on a luminance of the light and color corresponding to the predetermined wavelength.

20. The image generation device according to claim 1, wherein the instruction device is a drawing device for a space drawing.

21. The image generation device according to claim 1, wherein the instruction device has a print function of printing the drawing image generated by the image generation device.

22. An image generation method executed by a processor of an image generation device including a camera that is configured to capture an image including light emitted from an instruction device and the processor that is configured to generate a drawing image based on a detection status in which the light is detected from the captured image, the image generation method comprising, to generate the drawing image:
causing the camera to reduce an exposure of an entire imaging surface to capture the captured image, by a predetermined amount, from a standard exposure specified for imaging according to an imaging environment of the camera;
detecting the light from the captured image, which is captured in a state in which the exposure is reduced by the predetermined amount; and
recording the drawing image, which is generated based on the detection status of the light, by correcting a brightness of a background region, which is a background of the detected light.

23. The image generation method according to claim 22, wherein
the image generation method comprising:
causing the camera to change an exposure of an entire imaging surface to capture the captured image;
causing the camera to capture a background image, which is a background of the light in the captured image, by adjusting the exposure; and
generating a composite image by composing the drawing image drawn based on the detection status in which the light is detected and the background image.

24. A non-transitory storage medium storing an image generation program for causing a processor of an image generation device including a camera that is configured to capture an image including light emitted from an instruction device and the processor that is configured to generate a drawing image based on a detection status in which the light is detected from the captured image, to execute processing comprising, to generate the drawing image:
causing the camera to reduce an exposure of an entire imaging surface to capture the captured image, by a predetermined amount, from a standard exposure specified for imaging according to an imaging environment of the camera;
detecting the light from the captured image, which is captured in a state in which the exposure is reduced by the predetermined amount; and
recording the drawing image, which is generated based on the detection status of the light, by correcting a brightness of a background region, which is a background of the detected light.

25. The non-transitory storage medium according to claim 24, wherein the image generation program for causing the processor to execute processing comprising:
    causing the camera to change an exposure of an entire imaging surface to capture the captured image;
    causing the camera to capture a background image, which is a background of the light in the captured image, by adjusting the exposure; and
    generating a composite image by composing the drawing image drawn based on the detection status in which the light is detected and the background image.

\* \* \* \* \*